E. BACHELET.
LEVITATING APPARATUS FOR CONVEYING AMMUNITION, &c.
APPLICATION FILED FEB. 15, 1912.
1,051,056.
Patented Jan. 21, 1913.
2 SHEETS—SHEET 1.
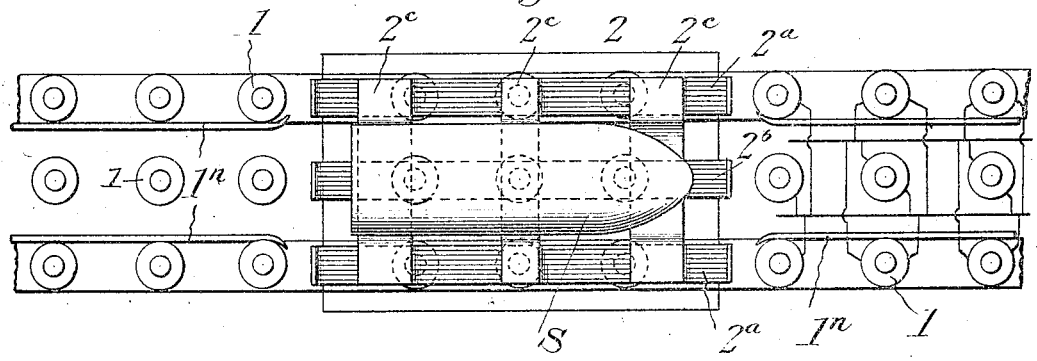
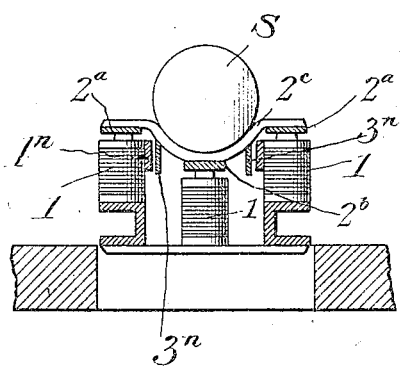
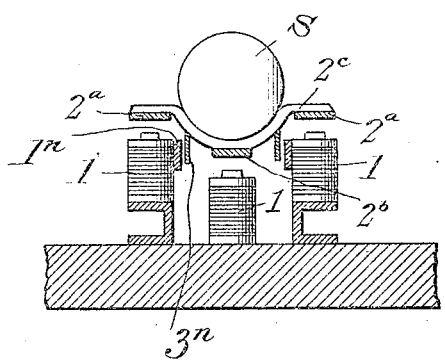
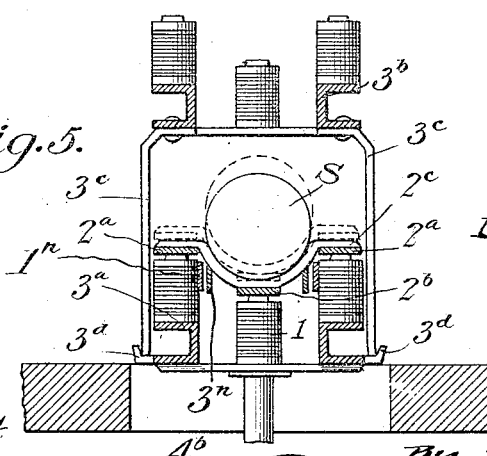
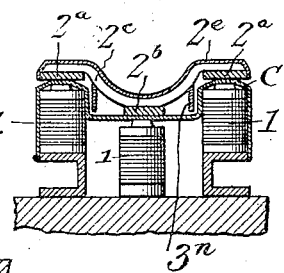
WITNESSES
INVENTOR
Emile Bachelet
By Alexander Powell Attorneys

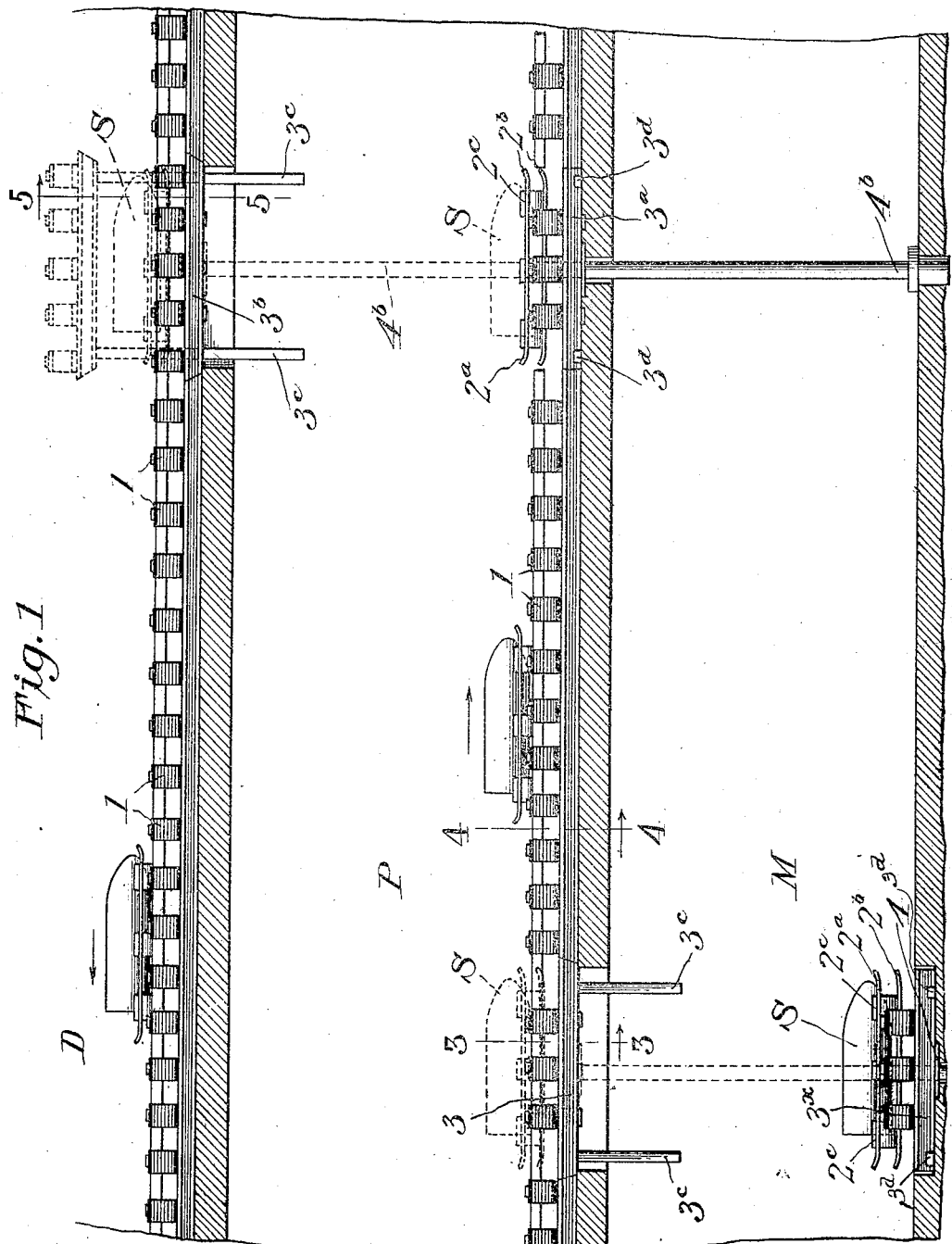

UNITED STATES PATENT OFFICE.

EMILE BACHELET, OF MOUNT VERNON, NEW YORK, ASSIGNOR OF ONE-HALF TO MILES R. BRACEWELL, OF NORTH ADAMS, MASSACHUSETTS.

LEVITATING APPARATUS FOR CONVEYING AMMUNITION, &c.

1,051,056.

Specification of Letters Patent.　　Patented Jan. 21, 1913.

Application filed February 15, 1912. Serial No. 677,776.

*To all whom it may concern:*

Be it known that I, EMILE BACHELET, of Mount Vernon, in the county of Westchester and State of New York, have invented certain new and useful Improvements in Levitating Apparatus for Conveying Ammunition, &c.; and I hereby declare that the following is a full, clear, and exact description thereof, reference being had to the accompanying drawings, which form part of this specification.

This invention is a novel improvement in transporting apparatus, and is particularly adapted for use in fortresses and on shipboard, for the safe and rapid transportation of ammunition, or high explosives from the magazines to the point of use; also for use in handling high explosives in powder works; also for transport of fragile substances and things; and other uses in the arts; as will be readily seen by engineers and mechanicians, when the invention is understood by them.

The particular object of the invention is to enable matters to be levitated and transported or moved along suitable guideways without any friction, and without the employment of any chains, belts or other power driven mechanical parts which might be liable to cause friction, or clash, and be dangerous to the workmen or others near the apparatus.

The apparatus will be noiseless and require very little room; and will enable the ammunition to be kept under manual control if desired without any actual labor on the part of the attendant while in transit.

The invention in brief consists in providing a levitating carrier or, series of carriers, and guideways for such carriers, along and over which the carriers will float and may be traversed in any desired manner, preferably by an attendant who,—as the carrier is levitated, or floating in the air, with its burden and has no friction to overcome,—can by a slight push move the levitated carrier and cause it to traverse from one end of the guideway to the other.

The carriers are levitated by electromagnetic repulsion, as described in my U. S. applications Serial No. 553,134, filed April 2, 1910, and Serial No. 556,712, filed April 21, 1910, and I will explain the general construction and operation of such apparatus as adapted particularly for fortresses and war-ships.

The drawings illustrate in a conventional and semi-diagrammatic manner a levitating apparatus for transferring ammunition or other material from one place to another.

In said drawings—Figure 1 represents partly in elevation and partly in sectional diagrammatic elevation, an apparatus for transporting ammunition, high explosives, fragile material, from place to place. Fig. 2 is an enlarged detail plan view of one of the carriers, and part of the related guideway. Fig. 3 is an enlarged transverse section on line 3—3, Fig. 1, showing the carrier not levitated. Fig. 4 is a similar sectional view on line 4—4, Fig. 1, showing the carrier levitated. Fig. 5 is a similar section on line 5—5, Fig. 1. Fig. 6 is a detail section illustrating how the carrier and guideway may be covered or incased.

In the drawings M represents the magazine of a vessel or fort; above which is a passageway P; and above that a second passage or gun-deck D. In the passageway P is arranged a guideway which preferably consists of three parallel series of electromagnets 1. The central row of electromagnets is preferably arranged below the plane of the two adjacent rows. The magnets are preferably set with their poles vertical, and are all preferably connected in multiple so that they may be energized simultaneously. The electrical connections are merely diagrammatically illustrated in Fig. 2 of the drawings and need no particular description. All the magnets may be energized simultaneously,—but if the guideway is very long the magnets might be arranged in groups, and the magnets in such groups be successively energized as the carrier, hereinafter referred to, approaches and traverses same,—substantially as described in my aforesaid application. A similar guideway may be arranged as shown on the superposed gun-deck or passage D. The aforesaid arrangement of the magnets in parallel rows makes a kind of trough-shaped guideway, see Figs. 3 and 4, and the whole series of magnets in a guideway might be covered or inclosed in a suitable non-conducting casing of any suitable material, as indicated at C in Fig. 6, so as to prevent contact with the magnets, and to present a neater appearance when not in use. Such a casing however is not essential.

While I have shown but two series of guideways, similar guideways may be arranged if desired on every deck of the vessel, or every floor of the fort or building, in which the apparatus is used. Adapted to traverse such guideways are carriers 2; each of which is preferably cradle-shaped as shown, and has a central portion adapted to depend between the two outermost rows of magnets; and each carrier may be formed entirely of aluminum, or be provided at each side with longitudinal shoes or bars $2^a$ of aluminum; or of a material having antimagnetic qualities like aluminum, as described in my applications aforesaid. Such carriers when placed on such guideways will, when the magnets are energized by a periodic intermittent or alternating electrical current, be repelled with great force from the magnetic field, or poles of the magnets, and consequently will be levitated, as indicated in Fig. 4, and actually float above the guideway, see Fig. 4. The degree of levitation or flotation of the carrier can be controlled both by the weight of and upon the carrier, and by the nature and strength of the periodic current energizing the magnets.

The carrier bars $2^a$, $2^b$, may be connected by inverted yoke-shaped pieces $2^c$ that may be of any suitable material; and if desired the carrier might be covered on its upper side with any suitable material, as indicated at $2^e$, in Fig. 6.

If the carrier is to transport heavy loads, it may be provided with a central bar $2^b$ of aluminum, arranged to come opposite the central row of magnets, as indicated in the drawings, and which will correspondingly increase the lifting power, or carrying capacity, of the carrier.

While I have shown an arrangement of three rows of magnets in each guideway it should be understood that the invention is not restricted to any particular number of rows; and the number of rows of magnets employed, and the size of the individual magnets, will depend upon the nature of the service which the apparatus is to render, and upon the strength of the current available for energizing the magnets.

Obviously the particular shape or form of the carrier is not essential. It might be made wholly of aluminum. In the drawings I have shown the carrier cradle-shaped for the purpose of accommodating shells S, but the carrier may be of any desired shape according to the nature of the material or object which it is desired to transport thereby; and carriers of different form, or size may be employed in connection with the same guideway, to transport different objects or materials thereover.

To prevent the carriers while levitated being laterally displaced relative to the guideways, any suitable devices may be used that will not hinder the levitation of the carriers; for example the carriers may be provided with depending fingers or flanges $3^n$ preferably of non-magnetic material opposite guide bars or stops $1^n$ at the inner sides of the outermost rows of magnets, see Figs. 3 to 6; these devices will prevent the carriers being pushed sidewise off the guideway while levitated, but will produce no appreciable friction.

To facilitate the shifting of a loaded carrier from one guideway to another, or from the magazine to a superposed guideway, a section or sections of the guideway slightly longer than the carrier may be made movable; and, as shown in Fig. 1, a section $3^c$ of the lower guideway may be made removable, and a corresponding section $3^x$ (Fig. 1) may be mounted upon a suitable elevator (a hydraulic elevator 4 being indicated in the drawings) within the magazine; and this section $3^x$ can be lowered into the magazine, as indicated in full lines in Fig. 1; and a carrier 2 can then be placed on this section $3^x$, while lowered in the magazine, and loaded with a shell S or other material. Then the section $3^x$ can be elevated, thereby lifting section 3 out of place and taking the place of the latter; then when the electric circuit is closed through the magnets the carrier will be levitated, as indicated in Fig. 4, and may then be easily moved off of section $3^x$ and along the guideway, as by giving it a shove with the hand; or a care-taker can run along with the carrier and stop same at the point where it is desired; or one man could stand at the point 3 and send the carriers right or left as he wishes; and as the carriers absolutely float in the air there will be no friction to overcome, and the carriers will traverse the way and can be arrested at the desired point by another attendant.

The section 3 may be provided with depending bars $3^c$ which will be engaged by corresponding projections $3^d$ on the section $3^x$ as it rises, so that section 3 may be automatically removed from position in the guideway when section $3^x$ rises; and be automatically restored to position in the guideway when section $3^x$ is lowered.

The carriers could be caused to traverse the ways if desired, by solenoids, or any other desired means, as explained in my aforesaid application; but where the guideways are short, or the carriers only have to move short distances, such as an ordinary ship's length, no propelling means will be required, nor need be used; for no matter what the weight of the loaded carrier may be, (up to the maximum that is to be levitated) it can be given a shove and will traverse the guideway until it is stopped by an attendant or suitable arresting means, since there is no friction to be overcome other than skin friction of the air against the moving carrier and the object thereon.

The carriers may be shifted from one superposed guideway to another by any suitable means. As indicated in Fig. 1 the superposed guideways may have similar removable track sections at corresponding points (indicated at 3ᵃ and 3ᵇ) each long enough to contain a carrier; and the lower section may be operated for instance by a hydraulic ram 4ᵇ, indicated in the drawings; and if it is desired to move a carrier from a lower guideway to an upper guideway, such carrier may run over the section 3ᵃ, and then said section raised into the place of the section 3ᵇ of the superposed guideway, as indicated in Fig. 1. I prefer to provide means to remove section 3ᵇ automatically out of the way of section 3ᵃ when the latter rises; and return it to place when the latter descends. To illustrate, section 3ᵇ is shown as provided with depending rods 3ᶜ, which are adapted to engage lugs 3ᵈ on the section 3ᵃ as the latter rises, and cause section 3ᵇ to rise with the section 3ᵃ as indicated in Figs. 1 and 5, so that a carrier resting upon the section 3ᵃ can be readily moved from the said section 3ᵃ onto the upper way. In a similar but reverse manner the carriers could be lowered from an upper to a lower guideway.

So long as the magnets are not energized by a periodic current the apparatus will be inoperative. When the magnets are energized by a periodic current there is no danger if the apparatus is properly constructed; and no electric contacts need be exposed, and all the electric connections may be incased.

When the apparatus is to be used the magnets should be energized by a periodic current, such as an alternating or intermittent current of say 200 volts and upward. The carriers being principally or wholly of aluminum or similar non-magnetic material are very light and may be readily placed in or removed from the guideways by hand. When placed on the guideways if there is no current the carrier will rest upon the magnets as indicated in Fig. 3; but when the magnets are properly energized the carriers will be levitated, as indicated in Fig. 4 owing to the great repulsion between the guideway magnets and the aluminum, or like non-magnetic material, on the carrier, or of which the carrier may be composed. The carrier will therefore rise absolutely clear of the guideways and float a greater or less distance above such guideways, as indicated in Fig. 4, according to the weight upon the carrier and the strength of the current. In practice a rheostat might be provided to regulate the current in the magnets and thus control the distance which the carriers will be levitated, according to the weight which the carriers support. When used as an ammunition carrier, a shell S, or bag of powder, etc., may be loaded onto the carrier while it is resting upon the ways, or while the carrier is supported upon a section of the guideway, as indicated at 3ˣ in Fig. 1; and before the carrier is levitated. Such section of the guideway with the loaded carrier thereon may then be elevated to the position of the section 3 in Fig. 1, and then the magnets energized, whereupon the loaded carrier will be levitated and it may be moved forward or back along the guideway, floating in the air without friction and therefore capable of being easily moved in either direction; and if given a slight shove it will continue to move to any point along the guideway to which it is desired to transport the ammunition; at which point the carrier may be arrested by an attendant. A loaded carrier can be passed directly from one guideway onto another; and may be readily transferred manually from one guideway to another if desired. Obviously such guideways can be extended to any portions of the vessel or building where it may be desired to transport ammunition or other matters.

Such an apparatus would be very useful in factories where it is desired to transport material from one place to another rapidly and easily, and is particularly adapted for transporting fragile substances and dangerous explosives.

The carriers may be returned over the same guideways loaded or unloaded; or other guideways may be provided over which the carrier can be returned empty, and which need not be equipped with so many or so powerful magnets as the guideways for the loaded carriers.

The pitching of the vessel would have very little effect other than to accelerate the movement of the carrier when levitated if it was traveling in the direction in which the guideway is dipping; or to retard it if traveling in a direction opposite to the dipping of the guideway. In other words the carrier would remain levitated, and if the guideway was tilted in the direction in which the carrier was moving it would simply tend to accelerate the movement of the carrier; and if it was tilted in a contrary direction it would simply tend to retard the movement of the carrier.

What I claim is:

1. Apparatus for transporting ammunition and the like, comprising a guideway, means for producing a periodic electromagnetic field along such guideway, and a carrier adapted to traverse such guideway and be levitated when the carrier is placed over the guide way and the magnets are energized.

2. In an ammunition carrier, a guideway, means for producing a periodic electromagnetic field along the guideway, and a carrier of non-magnetic material such as aluminum adapted to be placed over the guideway and be levitated when the magnets are energized.

3. In transporting apparatus, the combination of a series of guideways, means for producing a periodic electromagnetic field along each guideway, carriers adapted to be levitated when placed over the guideway, and means for shifting the carrier from one guideway to another.

4. A transporting apparatus, comprising guideways, means for producing a periodic powerful magnetic field along the guideway, a carrier adapted to be levitated when placed in the guideway, and a movable guideway section adapted to register with different guideways for transferring a carrier from one guideway to another.

5. In transporting apparatus, the combination of a series of superposed guideways each having a movable section, means for producing a periodic electromagnetic field along each guideway, carriers adapted to be levitated when placed over a guideway, and means for shifting the movable section of one guideway into register with another guideway to transport the carriers from one guideway to another.

6. Transporting apparatus comprising a guideway consisting of parallel rows of electromagnets and a carrier adapted to traverse the guideway and having longitudinal aluminum bars or shoes opposite each row of magnets, and means for energizing the magnets to create a periodic magnetic field to levitate the carrier.

7. Transporting apparatus comprising a guideway consisting of parallel rows of electromagnets arranged with their axes parallel and vertical, and a carrier adapted to traverse the guideway and having a longitudinal aluminum bar or shoe over each row of magnets, and means for energizing the magnets to create a periodic magnetic field to levitate the carrier.

8. Transporting apparatus comprising a guideway formed of parallel rows of electromagnets, and arranged to form a trough-shaped guideway; with a carrier of non-magnetic conducting material adapted to be repelled from the magnets when the latter are energized by a periodic current thereby levitating the carrier.

9. Transporting apparatus comprising a guideway formed of parallel rows of electromagnets, arranged to form a trough-shaped guideway, with a carrier adapted to be placed over said guideway and provided with a longitudinal bar of aluminum or non-magnetic conducting material opposite each row of magnets and adapted to be repelled by the magnets when the latter are energized by a periodic current thereby levitating the carrier.

10. Transporting apparatus comprising a guideway formed of three or more parallel rows of electromagnets, intermediate rows being arranged below the plane of the outermost rows to form a trough-shaped guideway, with a trough-shaped carrier adapted to be placed over said guide and having bars of non-magnetic conducting material opposite the rows of magnets whereby the carrier is repelled from the magnets and levitated when the latter are energized by a periodic current.

11. Transporting apparatus comprising a guideway formed of three or more parallel rows of vertically disposed electromagnets, intermediate rows being arranged below the plane of the outermost rows to form a trough-shaped guideway; with a carrier adapted to be placed over said guideway; said carrier being provided with longitudinal bars of aluminum opposite the rows of magnets whereby it is repelled by the magnets and levitated when the magnets are energized by a periodic current.

In testimony that I claim the foregoing as my own, I affix my signature in presence of two witnesses.

EMILE BACHELET.

Witnesses:
JAMES R. MANSFIELD,
L. E. WITHAM.